(12) United States Patent
Kanno

(10) Patent No.: US 6,304,139 B1
(45) Date of Patent: Oct. 16, 2001

(54) TRANSMITTER ADJUSTING OUTPUT POWER

(75) Inventor: Susumu Kanno, Fukushima-ken (JP)

(73) Assignee: Alps Electric Co., Ltd., Tokyo (JP)

( * ) Notice: Subject to any disclaimer, the term of this patent is extended or adjusted under 35 U.S.C. 154(b) by 0 days.

(21) Appl. No.: 09/712,385

(22) Filed: Nov. 13, 2000

(30) Foreign Application Priority Data

Nov. 24, 1999 (JP) .................................................. 11-332986

(51) Int. Cl.[7] ....................................................... H03G 5/16
(52) U.S. Cl. ........................ 330/133; 330/129; 455/127; 455/522
(58) Field of Search .................................. 330/129, 133, 330/134; 455/126, 127, 522

(56) References Cited

U.S. PATENT DOCUMENTS

| 5,432,473 | * | 7/1995 | Mattila et al. ...................... 330/133 |
| 5,757,230 | * | 5/1998 | Mangelsdorf ........................ 330/133 |
| 5,764,107 |   | 6/1998 | Stone . |
| 6,215,987 | * | 4/2001 | Fujita .................................. 455/127 |

FOREIGN PATENT DOCUMENTS 10-70473    3/1998  (JP) .
10-242886   9/1998  (JP) .

* cited by examiner

Primary Examiner—Robert Pascal
Assistant Examiner—Henry Choe
(74) Attorney, Agent, or Firm—Brinks Hofer Gilson & Lione

(57) ABSTRACT

The transmitter adjusting output power is provided with a signal generator for generating a transmit signal, a variable-gain drive amplifying stage, a variable-gain power amplifying stage for amplifying in power the amplified transmit signal, and a control voltage generator for generating a first gain control voltage for adjusting the signal gain of the variable-gain drive amplifying stage and a second gain control voltage for adjusting the signal gain of the variable-gain power amplifying stage, wherein the control voltage generator generates the second gain control voltage to adjust the signal gain of the variable-gain power amplifying stage when the required signal level is not higher than a certain fixed level and generates a first gain control voltage to adjust the signal gain of the variable-gain drive amplifying stage when the required signal level is not lower than a certain fixed level.

2 Claims, 5 Drawing Sheets

TRANSMITTER ADJUSTING OUTPUT POWER

BACKGROUND OF THE INVENTION

1. Field of the Invention

The present invention relates to a transmitter adjusting output power, and more particularly to a transmitter which, driven by a battery as in the handset of a mobile telephone, adjusts output power so as to minimize the exhaustion of the power source battery when adjusting the output power of transmit signals.

2. Description of the Related Art

Usually, a cordless mobile telephone, when communicating with another mobile telephone, is subject to fluctuations in the field intensity of the receive wave reaching each mobile telephone depending on the distance between the calling party's mobile telephone and the corresponding telephone relaying base and the state of the wave transmission in-between, as well as the distance between the other party's mobile telephone and the corresponding telephone relaying base and the state of the wave transmission in-between.

If the field intensity of the receive wave reaching the calling party's mobile telephone is weak, the link with the other party may be so affected by noise and the like that satisfactory communication is difficult or sometimes even impossible. On the other hand, if the field intensity of the receive wave reaching the calling party's mobile telephone is strong, the transmission/reception of the wave may be taking place at a signal level which is higher than the necessary signal level. This is not desirable because the exhaustion of the power source battery of the mobile telephone would correspondingly increase.

For this reason, in order to ensure satisfactory communication between one mobile telephone and the other mobile telephone, and to avoid an unnecessary increase in battery exhaustion, when a wave transmitted from the other mobile telephone is received, the field strength of the receive wave should be detected. If the detected field strength is relatively large, the signal gain of the transmitter should be adjusted according to the relative level of the detected field strength to reduce the level of the transmit signal from the transmitter. If the detected field strength is relatively weak, the signal gain of the transmitter should be adjusted according to the relative level of the detected field strength to enhance the level of the transmit signal from the transmitter. Thus, by adjusting the level of the transmit signal sent from the respective transmitters of two mutually communicating mobile telephones, the field strength of the wave received by each other's mobile telephone can be regulated to a standard level, thereby enabling the two mobile telephones to communicate satisfactorily and prevent both mobile telephones from suffering unnecessary exhaustion of their respective power source batteries.

Know adjusting means for signal gains of transmitters in mobile telephone include a first gain adjusting means which fixes the signal gain in the power amplifying stage and makes controllable the signal gain in the drive amplifying stage with a gain control voltage to adjust the level of the transmit signal as required; and also known is a second gain adjusting means which fixes the signal gain in the drive amplifying stage and makes controllable the signal gain in the power amplifying stage with a gain control voltage to adjust the level of the transmit signal as required.

FIG. 3 is a block diagram illustrating the configuration of essential parts of a transmitter using a first gain adjusting means in a known mobile telephone.

As shown in FIG. 3, this transmitter is provided with a fixed-gain power amplifying stage (PA) 31, a variable-gain drive amplifying stage (DA) 32, a transmit signal generator 33, a gain control voltage generator 34, a transmit signal output terminal 35 and a transmit data (TX data) input terminal 36. Of the transmit signal generator 33, the input terminal is connected to the transmit data input terminal 36 and the output terminal is connected to the input terminal of the variable-gain drive amplifying stage 32. Of the variable-gain power amplifying stage 32, the control terminal is connected to the output terminal of the gain control voltage generator 34 and the output terminal is connected to the input terminal of the fixed-gain power amplifying stage 31. Of the fixed-gain power amplifying stage 31, the output terminal is connected to the transmit signal output terminal 35.

In this case, the transmit signal generator 33 forms a carrier frequency, and modulates the formed carrier frequency with transmit data (TX data) supplied to the transmit data input terminal 36 to generate a transmit signal, and the generated transmit signal is supplied to the variable-gain drive amplifying stage 32 that follows. The gain control voltage generator 34 generates a gain control voltage corresponding to the level of the receive signal that has been received (the field strength of the receive wave), and the gain control voltage so obtained is supplied to the variable-gain drive amplifying stage 32. Further, the transmit signal output terminal 35 is connected to a transmission antenna (not shown in FIG. 3).

Schematically, the transmitter using the first gain adjusting means having the above-described configuration operates in the following manner.

As the receiver (not shown in FIG. 3) of a mobile telephone receives a signal transmitted by the mobile telephone of the other party to the call, the controller (not shown in FIG. 3 either) detects a receive signal level representing the field strength of the receive wave. If the detected receive signal level is relatively low, the gain control voltage generator 34 generates a gain control signal to increase the signal gain of the variable-gain drive amplifying stage 32 according to the relative level of the receive signal level, and supplies it to the variable-gain drive amplifying stage 32. If the detected receive signal level is relatively high, the gain control voltage generator 34 generates a gain control signal to reduce the signal gain of the variable-gain drive amplifying stage 32 according to the relative level of the receive signal level, and supplies it to the variable-gain drive amplifying stage 32. After that, the variable-gain drive amplifying stage 32 amplifies the transmit signal supplied from the transmit signal generator 33 with a signal gain corresponding to the gain control signal, and supplies the amplified signal to the power amplifying stage 31. The power amplifying stage 31 further amplifies in power the supplied transmit signal, and supplies the amplified transmit signal to the transmission antenna via the transmit signal output terminal 35 to cause it to be transmitted from the transmission antenna. The transmit signal level required then is so controlled as to be raised when the receive signal level is too low and, conversely, to be lowered when the receive signal level is too high.

Hereupon, FIG. 4 shows the relationship between the transmit signal level (output power) of a transmitter using the first gain adjusting means and the current consumption by the power amplifying stage 31.

As illustrated in FIG. 4, in the transmitter using the first gain adjusting means, when the required transmit signal level is in a high range, the current consumption by the power amplifying stage 31 increases. In this case, if the required transmit signal level is within the range from 3 to 10 dBm, the rate of variation of the current consumption dependent on the variation of the required transmit signal level is relatively mild, remaining between 30 and 40 mA, but if the required transmit signal level exceeds 10 dBm to approach or reach 24 dBm, the rate of variation of the current consumption dependent on the variation of the required transmit signal level increases to an approximate range of 40 mA to 160 mA.

Next, FIG. 5 is a block diagram of essential parts of a transmitter using a second gain adjusting means in a known mobile telephone.

As illustrated in FIG. 5, this transmitter is provided with a variable-gain power amplifying stage (PA) 41, a fixed-gain drive amplifying stage (DA) 42, a transmit signal generator 43, a gain control voltage generator 44, a transmit signal output terminal 45 and a transmit data (TX data) input terminal 46.

Of the transmit signal generator 43, the input terminal is connected to the transmit data input terminal 46 and the output terminal is connected to the input terminal of the variable-gain power amplifying stage 42. The output terminal of the fixed-gain drive amplifying stage 42 is connected to the input terminal of the variable gain power amplifying stage 41. In the variable gain power amplifying stage 41 the output terminal is connected to the transmit signal output terminal 45 and the control terminal is connected to the output terminal of the gain control voltage generator 44.

Also in this case, the transmit signal generator 43 forms a carrier frequency, and modulates the formed carrier frequency with transmit data (TX data) supplied to the transmit data input terminal 46 to generate a transmit signal, and the generated transmit signal is supplied to the drive amplifying stage 42 that follows. The gain control voltage generator 44 generates a gain control voltage corresponding to the level of the receive signal that has been received (the field strength of the receive wave), and the gain control voltage so obtained is supplied to the variable-gain power amplifying stage 41. Further, the transmit signal output terminal 45 is connected to a transmission antenna (not shown in FIG. 5).

Schematically, the transmitter using the second gain adjusting means having the above-described configuration operates in the following manner.

As the receiver (not shown in FIG. 5) of a mobile telephone receives a signal transmitted by the mobile telephone of the other party to the call, the controller (not shown in FIG. 5 either) detects a receive signal level representing the field strength of the receive wave. If the detected receive signal level is relatively low, the gain control voltage generator 44 generates a gain control signal to increase the signal gain of the variable-gain power amplifying stage 41 according to the relative level of the receive signal level, and supplies it to the variable-gain power amplifying stage 41. If the detected receive signal level is relatively high, the gain control voltage generator 44 generates a gain control signal to reduce the signal gain of the variable-gain power amplifying stage 41 according to the relative level of the receive signal level, and supplies it to the variable-gain power amplifying stage 41. After that, the variable-gain drive amplifying stage 42 amplifies the transmit signal supplied from the transmit signal generator 43, and supplies the amplified signal to the variable-gain power amplifying stage 41. The variable-gain power amplifying stage 41 amplifies in power the supplied transmit signal with a signal gain corresponding to the gain control signal, and supplies the amplified transmit signal to the transmission antenna via the transmit signal output terminal 45 to cause it to be transmitted from the transmission antenna. The transmit signal level required then is so controlled as to be raised when the receive signal level is too low and, conversely, to be lowered when the receive signal level is too high.

Here, FIG. 6 shows the relationship between the transmit signal level (output power) of a transmitter using the second gain adjusting means and the current consumption by the power amplifying stage 41.

As illustrated in FIG. 6, in the transmitter using the second gain adjusting means, like the transmitter using the first gain adjusting means, when the required transmit signal level is in a high range, the current consumption by the power amplifying stage 41 increases. In this case, if the required transmit signal level is within the range from 2 to 12 dBm, the rate of variation of the current consumption dependent on the variation of the required transmit signal level is relatively mild, remaining between 10 and 35 mA. However if the required transmit signal level exceeds 12 dBm to approach or reach 24 dBm, the rate of variation of the current consumption dependent on the variation of the required transmit signal level increases to an approximate range of 35 mA to 160 mA.

By comparing the characteristic diagram of FIG. 4 with that of FIG. 6, if the required transmit signal level is within the range from 2 to 19 dBm, the transmitter using the second gain adjusting means consumes somewhat less current in its power amplifying stage, while in the transmit signal level range from 19 to 24 dBm, the transmitter using the first gain adjusting means consumes slightly less current in its power amplifying stage.

Since a cordless mobile telephone uses a battery as its power source, when the mobile telephone is used beyond a certain length of time, its battery becomes exhausted and the mobile telephone can no longer be used. For this reason, it is required that the power source battery of a mobile telephone be extended in durability as long as practicable to ensure a long service life of the telephone, and this requirement applies similarly to a mobile telephone having a transmitter using the first gain adjusting means and one having a transmitter using the second gain adjusting means, both described above.

In a mobile telephone having a transmitter using the first gain adjusting means or one having a transmitter using second gain adjusting means, their respective variable gain amplifying stages 32 and 41 are so adjusted as to achieve the required transmit signal level according to the relative level of the receive signal, the service life of the power source battery is extended by reducing the current consumption of the variable gain amplifying stage 32 or 41 when the required transmit signal level is adjusted to be relatively low, but the elongation of the battery's life is not sufficient and, by no means satisfactory.

SUMMARY OF THE INVENTION

An object of the present invention, attempted against this technical background, is to provide a transmitter which adjusts its output power so as to reduce the current consumption of the power amplifying stage by selectively using a gain adjusting means according to the range of the required transmit signal level, in achieving the required transmit signal level correspondingly to the receive signal level.

In order to achieve the above-stated object, a transmitter adjusting output power according to the invention is provided with a high-frequency signal generator for modulating a carrier frequency with transmit data to generate a transmit signal; a variable-gain drive amplifying stage for preamplifying the transmit signal; a variable-gain power amplifying stage for amplifying the preamplified transmit signal in power and supplying a transmit signal of a required signal level to an antenna; and a gain control voltage generator for generating a first gain control voltage with which to adjust the signal gain of the variable-gain drive amplifying stage and a second gain control voltage with which to adjust the signal gain of the variable-gain power amplifying stage, wherein the gain control voltage generator generates the second gain control voltage when the required signal level of the transmit signal is not above a certain fixed level to adjust the signal gain of the variable-gain power amplifying stage and, when the required signal level of the transmit signal is not below a certain fixed level, generates the first gain control voltage to adjust the signal gain of the variable-gain drive amplifying stage.

This configuration enables, when the required transmit signal level is to be set within a range not higher than a certain fixed level, the current consumption of the power amplifying stage to be reduced at each required transmit signal level within that range by adjusting the signal gain of the variable-gain power amplifying stage and, when the required transmit signal level is to be set within a range not lower than a certain fixed level, the current consumption of the power amplifying stage to be reduced at each required transmit signal level within that range by adjusting the signal gain of the variable-gain power amplifying stage. Therefore, compared with a transmitter which adjusts the signal gain of the variable-gain drive amplifying stage and a transmitter which adjusts the signal gain of the variable-gain power amplifying stage to achieve a required transmit signal level, a transmitter of this configuration can more effectively reduce the current consumption of the power amplifying stage for each required transmit signal level, making it possible to restrain the exhaustion of the power source battery and to extend the service life of a mobile telephone.

Moreover, by this configuration, when the required transmit signal level is to be set in a higher range, the signal gain of the variable-gain drive amplifying stage is adjusted and the signal gain of the variable-gain power amplifying stage is not adjusted. Accordingly, the occurrence of signal distortion in the variable-gain power amplifying stage due to a signal gain when the required transmit signal level is high can be restrained.

Further according to the invention, it is preferable that the fixed level be the transmit signal level at the intersection of the characteristic curve representing the relationship between the transmit signal level achieved by adjusting the signal gain of the variable-gain drive amplifying stage and the current consumption of the power amplifying stage, and that representing the relationship between the transmit signal level achieved by adjusting the signal gain of the variable-gain power amplifying stage and the current consumption of the power amplifying stage.

This configuration allows selective use, according to the range of the required transmit signal level, of the characteristic curve representing the relationship between the transmit signal level achieved by adjusting the signal gain of the variable-gain drive amplifying stage and the current consumption of the power amplifying stage or that representing the relationship between the transmit signal level achieved by adjusting the signal gain of the variable-gain power amplifying stage and the current consumption of the power amplifying stage, making it possible to reduce the current consumption of the power amplifying stage for each required transmit signal level in a satisfactory way.

DETAILED DESCRIPTION OF PREFERRED EMBODIMENT

A preferred embodiment of the present invention will be described below with reference to the accompanying drawings.

Figure 1:
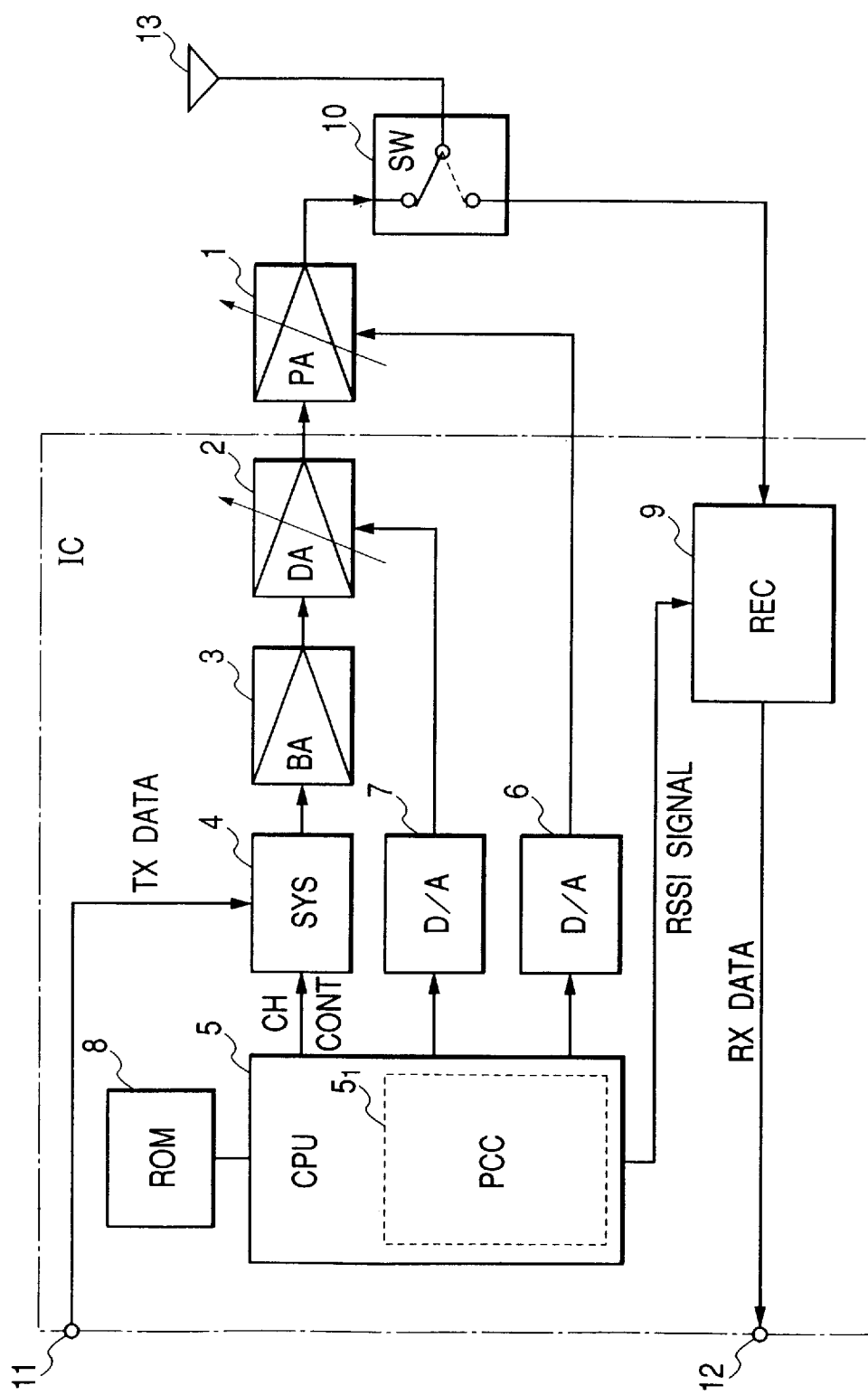
FIG. 1 is a block diagram illustrating one embodiment of the configuration of a transmitter adjusting output power according to the present invention.

FIG. 1, which is a block diagram of the embodiment of the configuration of a transmitter adjusting output power according to the invention, shows the essential parts of a mobile telephone including the transmitter of the present invention.

As shown in FIG. 1, the mobile telephone including the transmitter embodying the invention in this mode consists of a variable-gain power amplifying stage (PA) 1, a variable-gain drive amplifying stage (DA) 2, a buffer amplifying stage (BA) 3, a synthesizer (SYS, high-frequency signal generator) 4, a controller (CPU) 5, a power controller (PCC, gain control voltage generator) $5_1$, a first digital-to-analog converter (D/A) 6, a second digital-to-analog converter (D/A) 7, a ROM 8, a receiver circuit (REC) 9, a transmit/receive change-over switch 10, a transmit (TX) data input terminal 11, a receive (RX) data output terminal 12, and a transmission/reception antenna 13. The power controller $5_1$ is built into the controller 5. The circuit section including the variable-gain drive amplifying stage 2, the buffer amplifying stage 3, synthesizer 4, the controller 5, the power controller $5_1$, the first digital-to-analog converter 6, the second digital-to-analog converter 7, the ROM 8 and the receiver circuit 9 is configured of a single integrated circuit (IC).

In this case, the synthesizer 4, which forms a carrier frequency by frequency synthesis, sets the carrier frequency with a channel control signal (CH Cont) supplied from the controller 5. The carrier frequency so formed is modulated with transmit data (TX data) supplied to the transmit data input terminal 11, and a transmit signal consisting of the modulated carrier frequency are generated. The power controller $5_1$ selectively generates a first gain control signal in the digital form or a second gain control signal in the digital form according to the level of the receive signal supplied to the controller 5. The ROM 8 stores a transmit signal level (a fixed level; how to set this fixed level will be described later) indicating the point of time of switching between the supply of the first gain control signal and that of the second gain control signal from the power controller 5₁.

In the synthesizer 4, a first input terminal is connected to the controller 5, a second input terminal is connected to the transmit data input terminal 11, and the output terminal is connected to the input terminal of the buffer amplifying stage 3. In the variable-gain drive amplifying stage 2, the input terminal is connected to the output terminal of the buffer amplifying stage 3, the output terminal is connected to the input terminal of the variable-gain power amplifying stage 1, and the control terminal is connected to the output terminal of the second digital-to-analog converter 7. In the variable-gain power amplifying stage 1, the output terminal is connected to one of the fixed contacts of the transmit/receive change-over switch 10, and the control terminal is connected to the output terminal of the first digital-to-analog converter 6. In the first digital-to-analog converter 6, the input terminal is connected to the controller 5, and of the second digital-to-analog converter 7 the input terminal is connected to the controller 5. The ROM 8 is also connected to the controller 5. In the receiver circuit 9, the input terminal is connected to the other fixed contacts of the transmit/receive change-over switch 10, the output terminal is connected to the receive data output terminal 12, and the control terminal is connected to the controller 5. In the transmit/receive change-over switch 10, a movable contact is connected to the transmission/reception antenna 13.

The mobile telephone including the transmitter embodying the invention in this mode configured as described above operates as described below.

When the mobile telephone is in its reception mode and the contact of the transmit/receive change-over switch 10 is in the position indicated by the dotted line, if the transmission wave from the other party's mobile telephone (not shown in FIG. 1) is received by the transmission/reception antenna 13, a receive signal is supplied to the receiver circuit 9 from the transmission/reception antenna 13 via the transmit/receive change-over switch 10. The receiver circuit 9 amplifies and detects the supplied receive signal to obtain receive (RX) data, and generates an RSSI signal representing the receive signal level. The obtained receive data is supplied from the receiver circuit 9 to the receive data output terminal 12, and the RSSI signal is supplied from the receiver circuit 9 to the controller 5.

Then, when the mobile telephone is set into its transmission mode, the contact of the transmit/receive change-over switch 10 is turned over to the position indicated by the solid line. Then the controller 5 detects the receive signal level from the receiver circuit 9 on the basis of the supplied RSSI signal, and sets the transmit signal level required for supplying an output from the variable-gain power amplifying stage 1 on the basis of the detected receive signal level. Next, the controller 5 compares the transmit signal level that has been set with the fixed level read out of the ROM 8 and, if the comparison reveals that the set transmit signal level is lower than the fixed level, causes the power controller 5₁ to generate a first gain control signal in the digital form to supply it to the first digital-to-analog converter 6. The first digital-to-analog converter 6 converts the first gain control signal in the digital form into a first gain control voltage in the analog form, and supplies it to the variable-gain power amplifying stage 1. At the same time, the synthesizer 4 generates a transmit signal by modulating the carrier frequency with transmit data supplied to the transmit data input terminal 11, and supplies this transmit signal to the buffer amplifying stage 3. The buffer amplifying stage 3 amplifies the transmit signal, and supplies the amplified transmit signal to the variable-gain drive amplifying stage 2. The variable-gain drive amplifying stage 2, since no second gain control voltage in the analog form is supplied at this point of time, amplifies the transmit signal with a fixed gain, and supplies the amplified transmit signal to the variable-gain power amplifying stage 1. The variable-gain power amplifying stage 1 amplifies in power the transmit signal with a signal gain matching the supplied first gain control voltage, and supplies the amplified transmit signal to the transmission/reception antenna 13 via the transmit/receive change-over switch 10, and transmits it from the transmission/reception antenna 13.

However, if when, the controller 5 compares the transmit signal level that has been set with a fixed level read out of the ROM 8, and the comparison reveals that the set transmit signal level is higher than the fixed level, this causes the power controller 51 to generate a second gain control signal in the digital form to supply it to the second digital-to-analog converter 7. The second digital-to-analog converter 7 converts the second gain control signal in the digital form into a second gain control voltage in the analog form, and supplies it to the variable-gain drive amplifying stage 2. In this procedure again, the synthesizer 4 generates a transmit signal by modulating the carrier frequency with transmit data supplied to the transmit data input terminal 11, and supplies this transmit signal to the buffer amplifying stage 3. The buffer amplifying stage 3 amplifies the transmit signal, and supplies the amplified transmit signal to the variable-gain drive amplifying stage 2. The variable-gain drive amplifying stage 2 amplifies the transmit signal with a signal gain matching the supplied second gain control voltage, and supplies the amplified transmit signal to the variable-gain power amplifying stage 1. The variable-gain power amplifying stage 1, since no first gain control voltage in the analog form is supplied at this point of time, amplifies in power the transmit signal with a fixed gain, supplies the amplified transmit signal to the transmission/reception antenna 13 via the transmit/receive change-over switch 10, and transmits it from the transmission/reception antenna 13.

Figure 2:
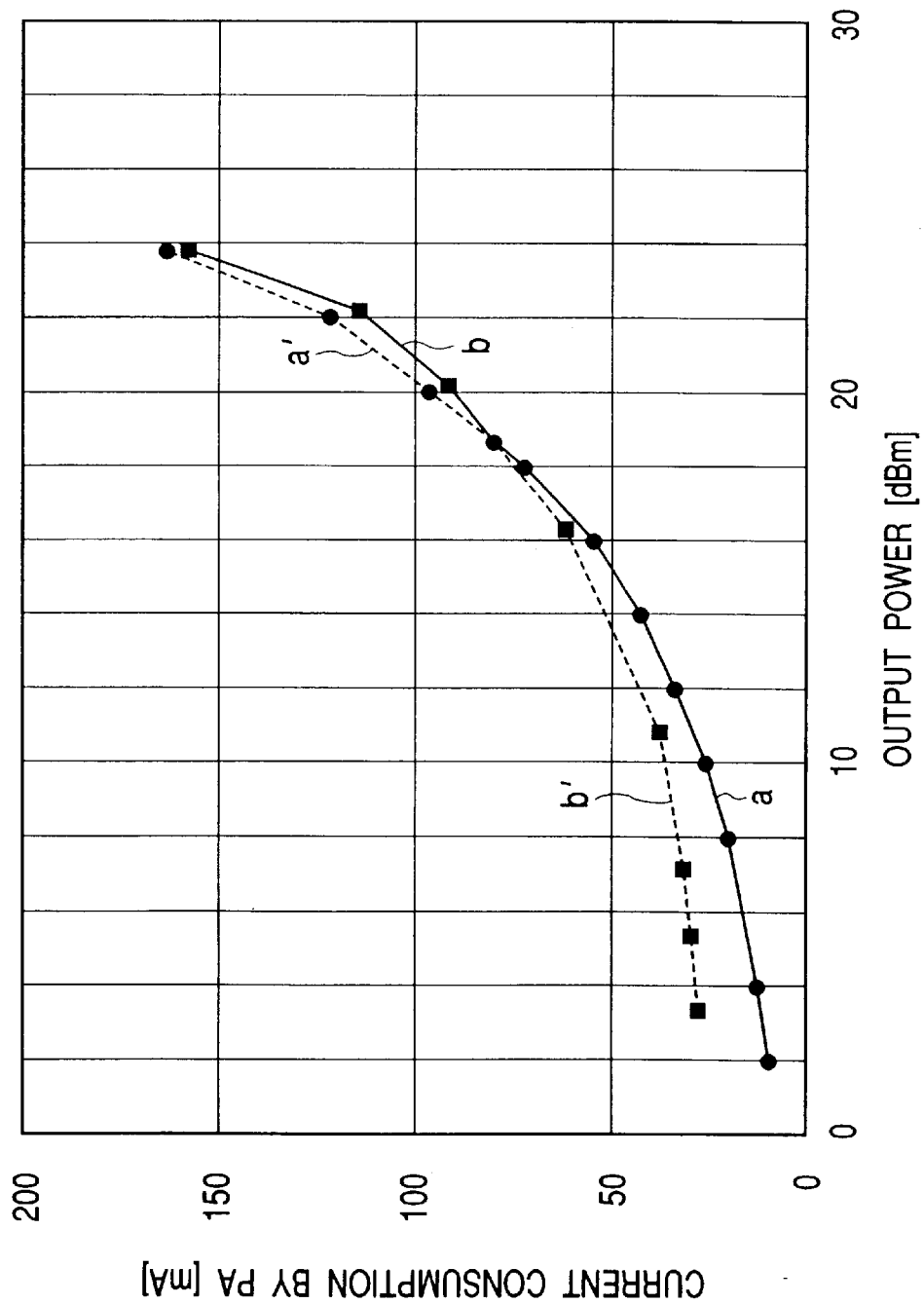
FIG. 2 is a characteristic diagram illustrating the relationship between the transmit signal level (output power) and the current consumption of the power amplifying stage in the transmitter adjusting output power shown in FIG. 1.
Figure 3:
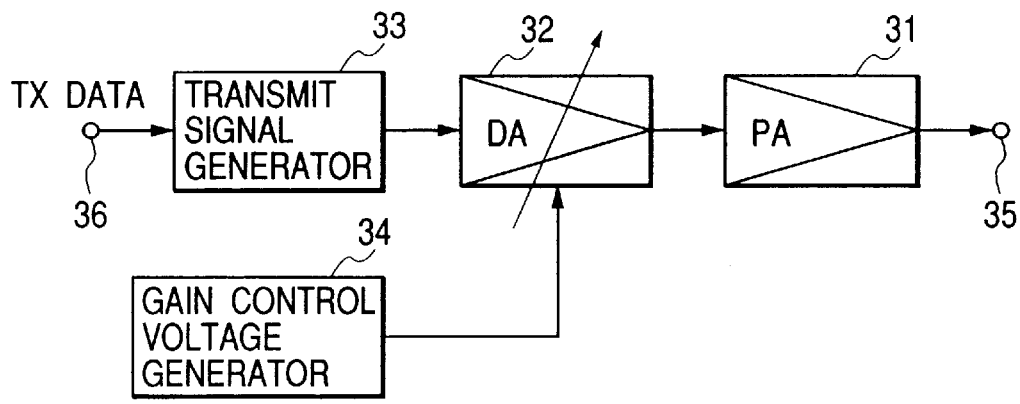
FIG. 3 is a block diagram illustrating the configuration of essential parts of a transmitter using the first gain adjusting means in a known mobile telephone.
Figure 5:
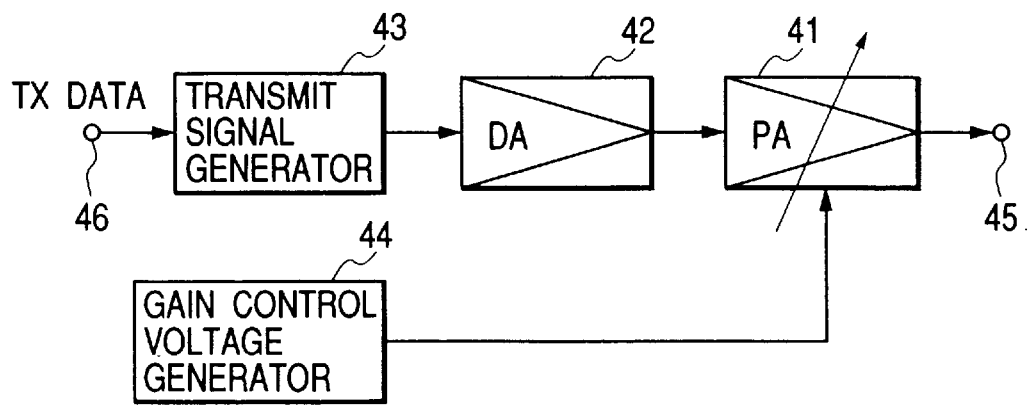
FIG. 5 is a block diagram illustrating the configuration of essential parts of a transmitter using the second gain adjusting means in a known mobile telephone.

FIG. 2 is a characteristic diagram illustrating the relationship between the required transmit signal level (output power) and the current consumption of the power amplifying stage 1 in the transmitter in this mode of embodying the invention shown in FIG. 1.

Figure 4:
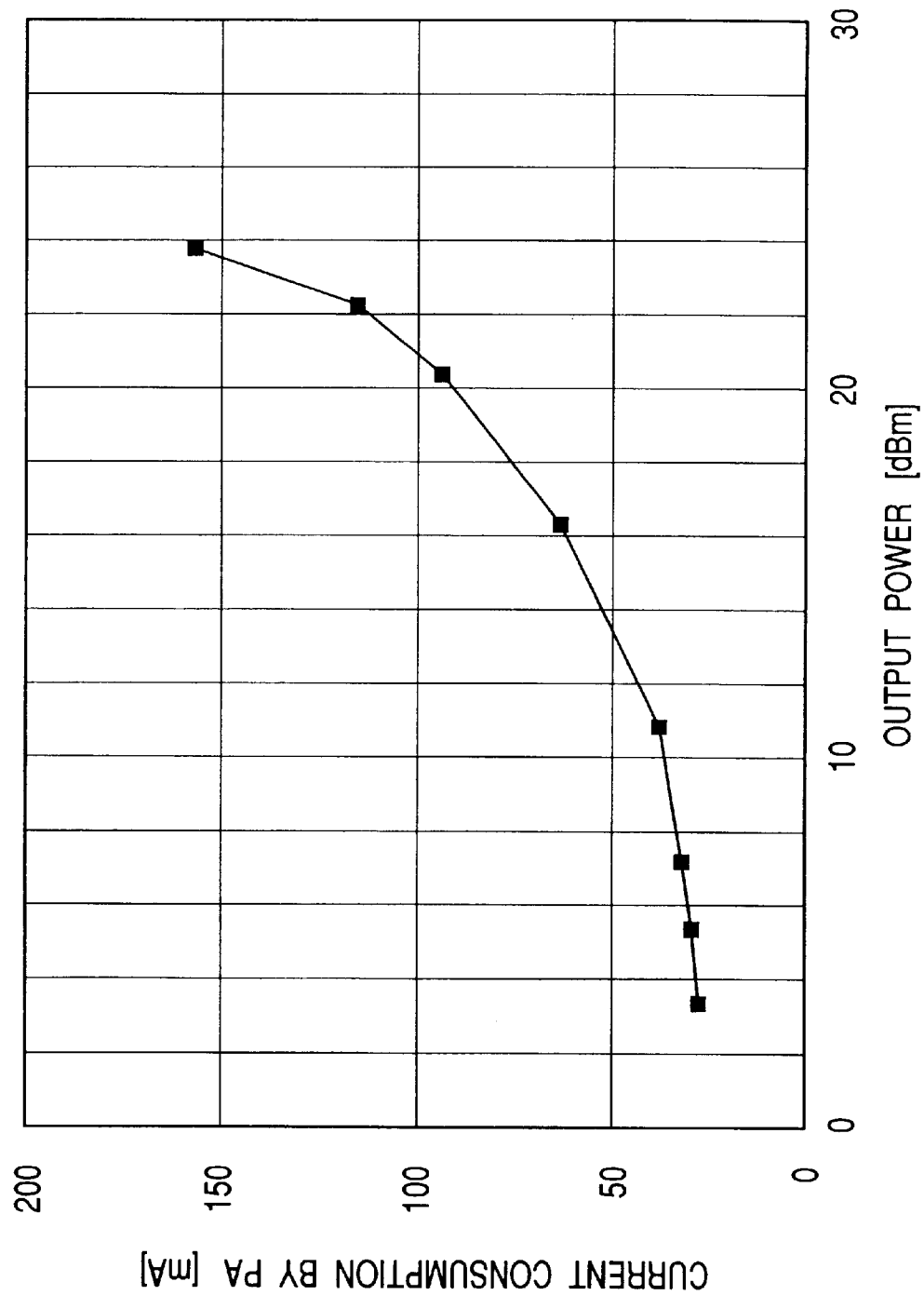
FIG. 4 is a characteristic diagram illustrating the relationship between the transmit signal level (output power) and the current consumption of the power amplifying stage in the transmitter using the first gain adjusting means shown in FIG. 3.
Figure 6:
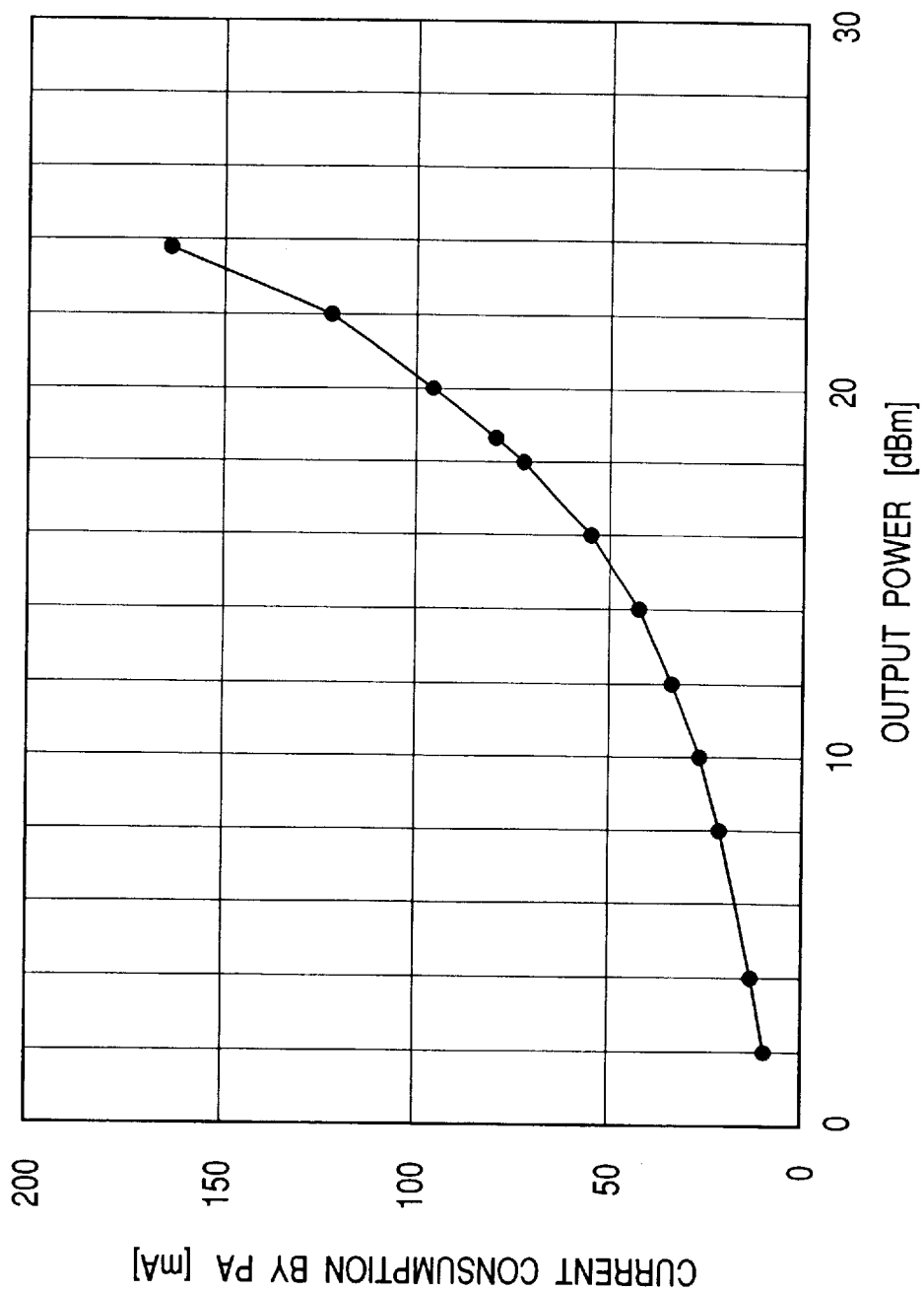
FIG. 6 is a characteristic diagram illustrating the relationship between the transmit signal level (output power) and the current consumption of the power amplifying stage in the transmitter using the second gain adjusting means shown in FIG. 5.

In the characteristic diagram of FIG. 2, the characteristic curve represented by the solid line a and by the dotted line a' are the same as the characteristic curve in the characteristic diagram of FIG. 6, and the characteristic curve represented here by the solid line b and the dotted line b' are the same as the characteristic curve in the characteristic diagram of FIG. 4.

As shown in FIG. 2, in the transmitter embodying the invention in this mode, as in the transmitter using the above-described known first gain adjusting means and that using above-described known second gain adjusting means, the current consumption of the variable-gain power amplifying stage 1 varies with any variation in the required transmit signal level. In this case, since the transmitter embodying the invention in this mode, when the required transmit signal level is in a range from 2 to 19 dBm, supplies the first gain control voltage to the variable-gain power amplifying stage 1 and obtains the required transmit signal level by controlling the signal gain. The current consumption of the variable gain power amplifying stage 1 represented by the solid line a of FIG. 2 is generally less than that represented by the dotted line b' of FIG. 2. Further, since it supplies the second gain control voltage to the variable-gain drive amplifying stage 2 and obtains the required transmit signal level at the output of the variable-gain power amplifying stage 1 by controlling the signal gain when the required transmit signal level is in a range from 19 to 24 dBm, the current consumption of the variable-gain power amplifying stage 1 represented by the solid line b of FIG. 2 is generally less that represented by the dotted line a' of FIG. 2.

To explain this point in further detail, the mobile telephone having a transmitter using the above-described known first gain adjusting means is in a range from 30 to 160 mA in the current consumption of the power amplifying stage 31 as illustrated by the characteristic diagram of FIG. 4 when the required transmit signal level corresponding to the receive signal level is in a range from 3 to 24 dBm. The mobile telephone having a transmitter using the above-described known second gain adjusting means is in a range from 10 to 160 mA in the current consumption of the variable gain power amplifying stage 41 as illustrated by the characteristic diagram of FIG. 6 when the required transmit signal level corresponding to the receive signal level is in a range from 2 to 24 dBm. And when the required transmit signal level is in a range from 3 to 19 dBm, the transmitter using the second gain adjusting means is generally less in the current consumption of the variable-gain power amplifying stage 41, while in a range of the required transmit signal level from 19 to 24 dBm, the transmitter using the first gain adjusting means is generally less in the current consumption of the power amplifying stage 31. Underlying the invention is the idea that, by effectively combining the first gain adjusting means and the second gain adjusting means and selectively using the first gain adjusting means or the second gain adjusting means according to the range of the required transmit signal level, in other words by selective use of means to control the signal gain of the variable-gain drive amplifying stage 2 with the second gain control signal or of means to control the signal gain of the variable-gain power amplifying stage 1 with the first gain control signal, the current consumption of the variable-gain power amplifying stage 1 can be kept less than that of the transmitter using the means to control the signal gain of the variable-gain drive amplifying stage 2 with the second gain control signal or the means to control the signal gain of the variable-gain power amplifying stage 1 with the first gain control signal.

For this reason, in this embodiment of the invention, the transmit signal level at the intersection of the characteristic curve represented by the solid line a and the dotted line a' and that represented by the solid line b and the dotted line b', 19 dBm in this case, is stored into the ROM 8 as the fixed level, and if the required transmit signal level has to be set not higher than the fixed level (19 dBm), a current consumption characteristic of the variable-gain power amplifying stage 1 along the characteristic curve represented by the solid line a is obtained by controlling the signal gain of the variable-gain power amplifying stage 1, or if the required transmit signal level has to be set not lower than the fixed level (19 dBm), a current consumption characteristic of the variable-gain power amplifying stage 1 along the characteristic curve represented by the solid line b is obtained by controlling the signal gain of the variable-gain drive amplifying stage 2.

Since the transmitter adjusting output power embodying the invention in this mode, when a required transmit signal level is to be achieved, gain control means whose variable-gain power amplifying stage 1 consumes less current is selectively used according to the range of the required transmit signal level, the consumption of power by a mobile telephone when it is in use can be reduced, and the duration of communication possible with the battery power source of the telephone can be extended correspondingly.

To add, although the foregoing embodiment uses as the fixed level to be stored in the ROM 8 the transmit signal level at the intersection of the characteristic curve representing the relationship between the transmit signal level achieved by adjusting the signal gain of the variable-gain drive amplifying stage 2 and the current consumption of the power amplifying stage 1 and that representing the relationship between the transmit signal level achieved by adjusting the signal gain of the variable-gain power amplifying stage 1 and the current consumption of the power amplifying stage 1, the fixed level according to the invention is not limited to the intersection of the two characteristic curves, but may be a vicinity of the transmit signal level, for instance, in a range from 2 to 3 dBm below and above that transmit signal level.

Further, although the foregoing embodiment is an example in which the transmitter adjusting output power is used in a mobile telephone, the transmitter adjusting output power according to the invention is not limited to use in a mobile telephone, but it can as well be used for adjusting the output power of the handset of a mobile telephone.

What is claimed is:

1. A transmitter adjusting output power comprising:
a high-frequency signal generator for modulating a carrier frequency with transmit data to generate a transmit signal; a variable-gain drive amplifying stage for preamplifying the transmit signal; a variable-gain power amplifying stage for amplifying the preamplified transmit signal in power and supplying a transmit signal of a required signal level to an antenna; and a gain control voltage generator for generating a first gain control voltage with which to adjust the signal gain of the variable-gain drive amplifying stage and a second gain control voltage with which to adjust the signal gain of the variable-gain power amplifying stage, wherein the gain control voltage generator generates the second gain control voltage when the required signal level of the transmit signal is not above a certain fixed level to adjust the signal gain of the variable-gain power amplifying stage and, when the required signal level of the transmit signal is not below a certain fixed level, generates the first gain control voltage to adjust the signal gain of the variable-gain drive amplifying stage.

2. A transmitter adjusting output power according to claim 1, wherein the fixed level is the transmit signal level at the intersection of a characteristic curve representing the relationship between the transmit signal level achieved by adjusting the signal gain of the variable-gain drive amplifying stage and the current consumption of the power amplifying stage, and the characteristic curve representing the relationship between the transmit signal level achieved by adjusting the signal gain of the variable-gain power amplifying stage and the current consumption of the power amplifying stage.

* * * * *